United States Patent
Shi et al.

(10) Patent No.: US 7,724,916 B2
(45) Date of Patent: May 25, 2010

(54) SYSTEM AND METHOD FOR DATA HIDING USING INTER-WORD SPACE MODULATION

(75) Inventors: Yun-Qing Shi, Millburn, NJ (US); Dekun Zou, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 925 days.

(21) Appl. No.: 11/325,598

(22) Filed: Jan. 3, 2006

(65) Prior Publication Data

US 2006/0257002 A1    Nov. 16, 2006

Related U.S. Application Data

(60) Provisional application No. 60/641,127, filed on Jan. 3, 2005.

(51) Int. Cl.
*G06K 9/00* (2006.01)

(52) U.S. Cl. ..................... 382/100; 235/470

(58) Field of Classification Search .............. 382/100, 382/232, 177, 174, 176; 716/176
See application file for complete search history.

(56) References Cited

U.S. PATENT DOCUMENTS

| | | | |
|---|---|---|---|
| 5,761,686 A * | 6/1998 | Bloomberg | 715/234 |
| 5,861,619 A * | 1/1999 | Horino et al. | 235/470 |
| 6,359,573 B1 | 3/2002 | Taruguchi et al. | |
| 7,260,238 B2 * | 8/2007 | Iwamura et al. | 382/100 |
| 7,386,149 B2 * | 6/2008 | Eguchi et al. | 382/100 |
| 2002/0118860 A1 | 8/2002 | Pasqua | |
| 2004/0022411 A1 * | 2/2004 | Tamaru et al. | 382/100 |
| 2006/0075241 A1 * | 4/2006 | Deguillaume et al. | 713/176 |

FOREIGN PATENT DOCUMENTS

WO    2006/074219 A3    7/2006

* cited by examiner

*Primary Examiner*—Charles Kim
*Assistant Examiner*—Claire Wang
(74) *Attorney, Agent, or Firm*—Connolly Bove Lodge & Hutz LLP

(57) ABSTRACT

Data may be embedded in rows of text by modulating inter-word spaces in a row. Inter-word spaces in a particular row may be divided into two or more sets of (approximately) equal spacing. The inter-word spaces of one or more of the sets may then be modified to embed data.

22 Claims, 4 Drawing Sheets

FIG. 1

Steganography is the art of hiding the very presence of b1 b2 b3 b4 b5    b6 b7   b8     b9
=  =  =  =  =     =  =    =     =
8  7  7  7  7     6  6    7     7

FIG. 2

Steganography is the art of hiding the very presence of

[ b1 b2   b3   b4 ] b5     [ b6   b7    b8      b9 ]
     Set A                 Set B

FIG. 5

|  | Employ original document? | Robust to printing, copying and scanning? | Embedding Capacity |
|---|---|---|---|
| Word shifting | Yes | A little | High (1bit/word) |
| Line shifting (using baseline) | No | Yes (but not good) | Low (0.5bit/line) |
| Line shifting (using centroid) | Yes | Yes | Medium (1bit/line) |
| Example Embodiment | No | Yes | Medium (1bit/line) |

FIG. 6

Steganography is the art of hiding the very presence of communication by embedding secret messages into innocuous looking cover documents, such as digital images. Detection of steganography, estimation of message length, and its extraction belong to the field of steganalysis. Steganalysis has recently received a great deal of attention both from law enforcement and the media. In our paper, we classify and review current stego-detection algorithms that can be used to trace popular steganographic products. We recognize several qualitatively different approaches to practical steganalysis – visual detection, detection based on first order statistics, dual statistics methods that use spatial correlations in images and higher-order statistics, universal blind detection schemes, and special cases, such as JPEG compatibility steganalysis. We also present some new results regarding our previously proposed detection of LSB embedding using sensitive dual statistics. The recent steganalytic methods indicate that the most common paradigm in image steganography – the bit-replacement or bit substitution – is inherently insecure with safe capacities.

FIG. 7

Steganography is the art of hiding the very presence of communication by embedding secret messages into innocuous looking cover documents, such as digital images. Detection of steganography, estimation of message length, and its extraction belong to the field of steganalysis. Steganalysis has recently received a great deal of attention both from law enforcement and the media. In our paper, we classify and review current stego-detection algorithms that can be used to trace popular steganographic products. We recognize several qualitatively different approaches to practical steganalysis – visual detection, detection based on first order statistics, dual statistics methods that use spatial correlations in images and higher-order statistics, universal blind detection schemes, and special cases, such as JPEG compatibility steganalysis. We also present some new results regarding our previously proposed detection of LSB embedding using sensitive dual statistics. The recent steganalytic methods indicate that the most common paradigm in image steganography – the bit-replacement or bit substitution – is inherently insecure with safe capacities.

FIG. 8

Steganography is the art of hiding the very presence of communication by embedding secret messages into innocuous looking cover documents, such as digital images. Detection of steganography, estimation of message length, and its extraction belong to the field of steganalysis. Steganalysis has recently received a great deal of attention both from law enforcement and the media. In our paper, we classify and review current stego-detection algorithms that can be used to trace popular steganographic products. We recognize several qualitatively different approaches to practical steganalysis – visual detection, detection based on first order statistics, dual statistics methods that use spatial correlations in images and higher-order statistics, universal blind detection schemes, and special cases, such as JPEG compatibility steganalysis. We also present some new results regarding our previously proposed detection of LSB embedding using sensitive dual statistics. The recent steganalytic methods indicate that the most common paradigm in image steganography – the bit-replacement or bit substitution – is inherently insecure with safe capacities.

SYSTEM AND METHOD FOR DATA HIDING USING INTER-WORD SPACE MODULATION

RELATED APPLICATION

This patent application claims priority to U.S. provisional patent application Ser. No. 60/641,127, titled "System and Method for Data Hiding Using Inter-word Space Modulation," filed on Jan. 3, 2005, by Shi et al., assigned to the assignee of the presently claimed subject matter.

BACKGROUND

The patent application relates to methods and apparatus for embedding data, such as in a document, and recovering the embedded data therefrom.

Digital data hiding has become a hot topic in the signal processing research community. Various processes have been proposed to hide data in images, video files, audio files, and the like. However, relatively little existing art is dedicated to hiding data in text and/or documents. A reason may be because changes to pixel values of text documents may generally result in visual artifacts, referred to here as salt-and-pepper noise.

It is noted that digital representations of documents may represent one pixel by a single bit, although, of course, this is merely an example. In one such arrangement, however, "1" may represent white, and "0" may represent black. Accordingly, hiding data in text documents may benefit from approaches different from those used to embed data in image, video, and/or audio files, for example.

One existing approach employs a block-based method to hide bits into document images. In this approach, patterns are predefined as "flippable" or "non-flippable". For flippable patterns, certain pixels may be flipped without resulting in a significant amount of perceptible artifacts. Data is embedded by flipping the flippable pixels to result in a total number of black pixels in a block to be even or odd according to whether a bit '1' or bit '0' is to be embedded in the block.

Another existing approach employs "boundary modifications," in which 100 pairs of five-pixel-long boundary patterns are defined. For each pair, there are two different patterns, an 'A' pattern and a 'D' pattern, which may be interchanged if the pair is flipped. By flipping between the patterns, a bit may be embedded into a five-pixel-long boundary.

The foregoing methods may be applied to arbitrary text documents and may generally embed between several hundred bits and several thousand bits depending, for example, on the size of the document in which the data is being embedded. However, for both existing methods, distortion inflicted on a "marked document," here, a document into which data has been embedded, may make correct retrieval of the hidden information more difficult. Distortions to documents may result from a variety of sources including, but not limited, to photocopying, printing, and scanning, to name a few.

Three methods for hiding data in text documents have been proposed: line shift coding, word shift coding, and feature coding. Line-shift coding and word-shift coding are resilient against the effects of printing, copying, and scanning to some extent. One drawback, however, hidden data extraction is difficult without the original document and this document may not be available in many cases. In one existing approach, a baseline method for line shift coding which did not require the original document is disclosed. However, the data embedding capacity is quite limited at about one bit for every two lines.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

FIG. 1 illustrates inter-word spaces in a text row according to one or more embodiments;

FIG. 2 illustrates a division of a selection of the inter-word spaces of FIG. 1 into two sets in accordance with one or more embodiments;

FIG. 5 is a table summarizing a comparison of performance characteristics for various data hiding approaches;

FIG. 6 illustrates a test document with a font size of 10 that may be suitable for marking;

FIG. 7 illustrates a version of the document of FIG. 6 which has been marked in accordance with a described embodiment; and FIG. 8 illustrates an image resulting from multiple instances of photocopying of the document of FIG. 7.

DETAILED DESCRIPTION

Figures 3, 4:
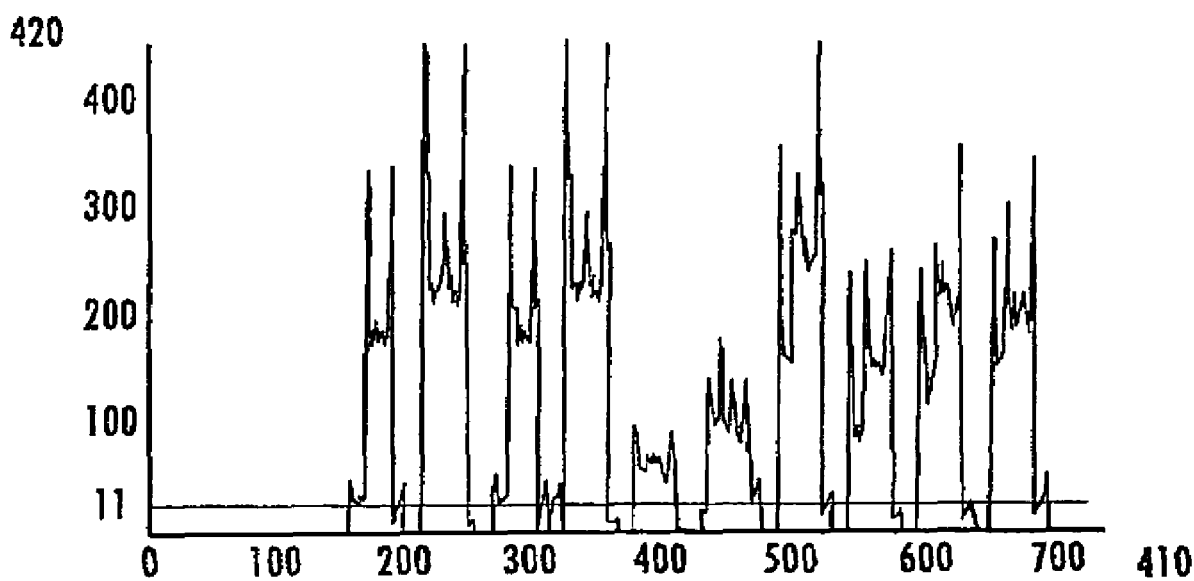
FIG. 3 illustrates a comparison between the text row of FIG. 1 before data embedding with the text row after data embedding using inter-word space modulation (ISM) in accordance with one or more embodiments.
FIG. 4 is a graph representing a horizontal profile of a document into which data may be.

In this particular context, for a formatted text document, the term inter-word space generally refers to the space between adjacent words in a text row. In one particular embodiment to be described, spaces on the boundaries of documents are not employed for data hiding. However, in alternative embodiments such spaces could be employed and claimed subject matter is intended to cover such alternate embodiments.

FIG. 1 illustrates an example of inter-word spacing in which there are nine inter-word spaces in a text row or text sequence). In this example, lengths of inter-word spaces may be measured and expressed in terms of pixels, although claimed subject matter is not limited in scope in this respect inter-word spaces in FIG. 1 are identified with labels b1 through b9. FIGS. 1-3 show the lengths of the inter-word spaces measured in pixels. Specifically, in FIG. 1, b1 is 8 pixels long, b2 through b5 are 7 pixels long, and so forth.

The length $\Phi$ of inter-word spaces of a row may be calculated as follows:

$$\Phi = \sum_{i=1}^{k} b_i \tag{1}$$

where, for a given "i," $b_i$ represents a particular inter-word spaces and "i" is employed as a reference numeral to indicate which space is referenced. Likewise, here, k is the total number of inter-word spaces in the text row concerned.

In one particular embodiment, inter-word spaces of a text row may be divided into two sets, such as set A and set B. In this example, the sets are divided so as to have the same number of inter-word spaces, although, of course, claimed subject matter is not limited in scope to the particular details of this example embodiment. Generally speaking, the sum of the lengths of the inter-word spaces for a particular set, referred to herein as the "total inter-word space," expressed in units of pixels, is expected to be very close to or even equal to the sum for another set. Thus, in this example, in which two sets are employed, A and B, set A and set B have an inter-word space or total inter-word space that is, in this example, equal. As described in more detail below, in one embodiment, data hiding may be implemented by generating a detectable difference between the inter-word spaces of such sets, such as A and B, for example.

FIG. 2 illustrates a division of a selection of the inter-word spaces of the text sequence or row of FIG. 1 into two sets. In this embodiment, as previously mentioned, set A and set B contain equal numbers of inter-word spaces, also referred to herein as "space elements". If an odd number of inter-word spaces is present in a text sequence, such as the one in FIG. 1, one or more inter-word spaces may be excluded from both set A and set B. In this embodiment, for example, inter-word space b5 is not included in either set A or set B. Although in this embodiment, eight of the nine inter-word spaces in the text row of FIG. 1 are included in either set A or set B, in alternative embodiments, a number of inter-word spaces other than eight may be selected for inclusion in at least one of the sets. Furthermore, other embodiments may include more sets.

After selected inter-word spaces are divided among sets A and B, the total inter-word spaces of set A and set B, denoted by $\Phi_A$ and $\Phi_B$, respectively, are summarized as follows. Using the text row of FIG. 2 as an example, the lengths are expressed as follows:

$$\Phi_A = b_1 + b_2 + b_3 + b_4 \quad (2)$$

$$\Phi_B = b_6 + b_7 + b_8 + b_9 \quad (3)$$

Proceeding, we have:

$$\Phi = \Phi_A + \Phi_B + b_5 \quad (4)$$

In this embodiment, data is embedded in the text row shown in FIG. 1 by modifying the lengths of the inter-word spaces. We use $\Phi'_A$ to denote the new length of inter-word spaces for Set A, and $\Phi'_B$ to denote the new length of inter-word spaces for Set B.

After embedding data, in this embodiment, the following conditions are satisfied:

To embed bit '1': $\Phi'_A - \Phi'_B = \epsilon$, (5)

to embed bit '0': $\Phi'_A - \Phi'_B = -\epsilon$, (6)

and: $\Phi'_A + \Phi'_B + b_5 = \Phi$ (7)

where $\epsilon$ here refers to "embedding strength" which may comprise an integer, for example. Embedding strength may indicate a difference between inter-word spaces of different sets after data has been embedded. Thus, $\epsilon$ may be viewed as a measure of distance which may be expressed in pixels. Generally, both the robustness of the hidden data and the extent of distortion of the marked image in comparison with the original image may increase with increasing values of $\epsilon$. Marked documents with smaller values of $\epsilon$ may therefore have the benefit of higher visual quality but may also experience less robust preservation of the marked data upon experiencing printing, copying, scanning and/or other document distortions. Of course, this is merely an example embodiment and claimed subject matter is not limited in this respect.

In one embodiment, for example, such as the one just described, the distance corresponding to embedding strength $\epsilon$ is spread at least approximately evenly among inter-word spaces of different sets, such as Set A and Set B, respectively, in this example. FIG. 3 illustrates the text row of FIG. 1 after data embedding, designated 320, compared with the text row prior to data embedding, designated 310. Here, 310 of FIG. 3 generally corresponds to the text row shown in FIG. 2. In this example, bit '1' is embedded in text row 320 of FIG. 3, while the value of b5 is kept unchanged.

It may be seen that the lengths of inter-word spaces of set A, in this example, have increased by one pixel in going from the upper text row 310 to the lower text row 320. Specifically, b1's length has been extended from 8 pixels to 9 pixels, while the lengths of b2 through b4 have been extended from 7 pixels to 8 pixels. Conversely, inter-word spaces of set B have been shortened by one pixel in going from row 310 to row 320. Specifically, the lengths of b6 and b7 have been shortened from 6 pixels to 5 pixels, and the lengths of b8 and b9 have been shortened from 7 pixels to 6 pixels. It can also be seen that b5's length of 7 pixels remains unchanged even after data is embedded, in this specific example. Of course, claimed subject matter is not limited in scope to the details of this example embodiment.

However, in this particular embodiment, the total length of the text sequence or text row remains unchanged after data has been embedded. Such constancy in the total length of the text sequence may assist in making hidden data imperceptible to the naked eye. This constancy can be obtained by increasing the inter-word space of one set by a selected amount and reducing the inter-word space of another set by this same selected amount, although claimed subject matter is not limited in scope in this respect. Many other approaches are possible and included within the scope of claimed subject matter other than the particular approach employed in this example.

In one embodiment, processing of a marked document may include, for example, some adjusting for geometric distortion, some noise adjustment, horizontal and vertical profiling, although claimed subject matter is not limited in scope in this respect.

For example, printing, scanning and copying may introduce geometric distortions, which may make data extraction more difficult. A variety of techniques to accomplish this are well-known and continuing to be developed. Therefore, the details of such techniques will not be discussed in detail other than to note that an example may include techniques disclosed in U.S. Pat. No. 6,708,884, entitled "Method and Apparatus for Rapid and Precision Detection of Omni-directional Postnet Barcode Location," issued Mar. 23, 2004. However, this patent is merely provided as one example and claimed subject matter is not limited in scope to employing the technique or techniques described therein.

Printing and copying may also introduce a distribution of small black spots onto a document. Such spots are referred to herein as pepper-like noise. If pepper-like noise exists between words, it may affect the measurement of the number of inter-word spaces and the measurement of the lengths of the inter-word spaces by the data extraction process, potentially producing errors. In one embodiment, isolated "black spots" may be removed.

It is noted that punctuation marks, such as periods, though they may resemble the "noise" spots, differ from noise spots. In one particular embodiment, a cluster of several black pixels may be removed whereas a single noise spot including one black pixel may not be removed.

A document image in some embodiments may comprise a matrix of pixels having bit values of either '0' or '1'. FIG. 4 is a typical horizontal profile of a such text document, although claimed subject matter is not limited in scope in this respect.

Referring to FIG. 4, a horizontal profile refers to a graph in which a horizontal axis, such as 410, represents the vertical position of a line in a text document image, and a vertical axis, such as 420, represents the number of black pixels in the line, although claimed subject matter is not limited in scope in this respect.

In a particular embodiment, a predetermined threshold η may established, as, for example, illustrated in FIG. 4. If the number of black pixels of a line is larger than η, this line may be considered to belong to a text row. In this context, a text row may comprise a group of consecutive lines, and two neighboring text rows may be separated by multiple blank lines. Herein a "blank line" refers to a line in which there are no black pixels.

In this particular embodiment, using the approach described above, text rows may be identified and separated. A vertical profile in this context refers to a graph (not shown) in which a horizontal axis represents positions of pixels in the text row, and a vertical axis represents the number of black pixels in each specific position along the text row. A vertical profile therefore may be generated from a text row for this particular embodiment. In such an embodiment, therefore, the number of consecutive zero points in the vertical profile is considered to be the length of an inter-word space.

In the particular embodiment just described, inter-word spaces have been identified and their lengths in pixels measured. This information may be employed to extract hidden data. For a given text row, for example, for this particular embodiment inter-word spaces may be grouped into two sets, A and B, corresponding to the data embedding stage for this particular embodiment. The inter-word spaces of sets A and B, $\Phi_A$ and $\Phi_B$ respectively, may be calculated. For example, if $\Phi_A - \Phi_B > 0$, bit '1' may be extracted from this text row, for this particular embodiment. Otherwise, a bit '0' may be extracted. In alternative embodiments, a non-zero threshold may be established for the value of the quantity $\Phi_A - \Phi_B$, referred to herein as "difference value". In such alternative embodiments, for example, difference values below this established threshold may indication extraction of a "0" bit, and difference values equal to or above this threshold may indicate extraction of a "1" bit, although claimed subject matter is not limited in scope in this respect.

Although claimed subject matter is not limited in scope to the embodiment described, nonetheless, it was applied experimentally to document images with various font sizes (from 9 to 20) to assess effectiveness. Embedding strength ϵ was set to be 10% of the total length of inter-word spaces of the whole text row. As a result, ϵ was not constant from one row to another. Adaptability of ϵ may assist in making the presence of hidden data less perceptible. FIG. 6 shows a test document with a font size of 10, and FIG. 7 shows a marked version of the test document of FIG. 6. In this embodiment, the data embedding capacity of the document of FIG. 7 is one bit per line. A difference between the text of FIG. 6 and that of FIG. 7 may be visible when the two documents are directly compared. However, upon looking at FIG. 7 by itself, no artifact is visible. Thus, the marked document of FIG. 7 looks normal in and of itself.

To undersand the robustness of the embedded data, the marked digital documents were printed using a Hewlett Packard Lasetjet 8150DN™ printer However, other printers could be employed, of course, and claimed subject matter is not limited in scope to this or to any particular printer. A hard copy was then photo-copied using a Canon ImageRUNNER 330S™ copier. However, again, other copying devices or other copying technologies could alternatively be employed.

In this context, multiple copying refers to repeatedly using a sheet resulting from one copying operation as the basis for a subsequent copying operation. This process generally deteriorates the quality of the image The successive copying operations here were conducted on the same machine, although, of course, that is not a requirement.

A resulting final copy was scanned back into digital form using an HP Scanjet 4400C™ scanner. However, again, other scanners could be employed. In this example, hidden was successfully extracted without error for all of the documents with the number of mutlipel copying operations ranging from 0 to 10. After ten successive copying operations, the quality of the document was generally degraded to such an extent that many letters could not be recognized. It is noted that documents having undergone more than ten consecutive copying operations may well have lost most of their value as text documents. FIG. 8, for example, is a reproduction of the text image of a document that underwent ten such successive copying operations. A comparison of this particular embodiment with various existing approaches is summarized in a table in FIG. 5, although, again, claimed subject matter is not limited in scope to this particular embodiment.

For example, there are many possible variations, some of which are discussed below. Although, again, these are also examples and claimed subject matter is not limited to only these variations. For example, arbitrary grouping of sets in a text row may be employed, although it may be desire to keep the numbers of inter-word spaces of different sets approximately even. However, if one inter-word space is blurred by noise and hence is missed by a detector, for example, a mistake may occur if random grouping of sets is employed. For example, the missing inter-word space unit could result in an inter-word space that properly belongs to one set to be incorrectly interpreted as belonging to another set. However, in the event of such an error, data extraction by comparing the lengths of inter-word spaces of sets may reduce the risk of such an occurrence. Likewise, it is noted that Error Correction Code (ECC) encoding of the information bits may increase the robustness of the embedded data, such as, for example, in a situation in which the number of rows exceeds the payload, although, again, this is merely one example.

It is, of course, now appreciated, based at least in part on the foregoing disclosure, that software may be produced capable of producing the desired processing. It will, of course, also be understood that, although particular embodiments have just been described, claimed subject matter is not limited in scope to a particular embodiment or implementation. For example, one embodiment may be in hardware, such as implemented to operate on a device or combination, for example, whereas another embodiment may be in software. Likewise, an embodiment may be implemented in firmware, or with any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of the claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of hiding data comprising:
    dividing inter-word spaces in a text row among a plurality of sets, said sets each having:
        at least two inter-word spaces, and
        an equal or nearly equal total inter-word length; and
    modifying the total inter-word length of at least one of said sets to embed a bit of data wherein the dividing and modifying are performed using one or more processing devices.

2. The method of claim 1, wherein not all inter-word spaces in said text row are included in said plurality of sets.

3. The method of claim 1, wherein said modifying comprises:
    reducing the total inter-word length of said at least one set.

4. The method of claim 1, wherein said modifying comprises:
    increasing the total inter-word length of at said least one set.

5. The method of claim 1, wherein said modifying comprises:
    reducing a total inter-word length of a first set of said sets; and
    increasing a total inter-word length of a second set of said sets.

6. The method of claim 1, further comprising:
    extracting said embedded data bit from said text row.

7. The method of claim 6, wherein where said text row is on a document that has undergone geometric distortion with respect to an original version of said document.

8. The method of claim 1, further comprising:
    extracting said embedded data bit from said text row without employing an original version of said text row.

9. An article comprising:
    a storage medium having stored thereon instructions that if executed by a computing device result in the computing device executing a method of hiding data comprising:
        dividing inter-word spaces in a text row among a plurality of sets, said sets each having:
            at least two inter-word spaces, and
            an equal or nearly equal total inter-word length; and
        modifying the total inter-word length of at least one of said sets to embed a bit of data.

10. The article of claim 9, wherein said instructions if executed further result in not all inter-word spaces in said text row being included in said plurality of sets.

11. The article of claim 9, wherein said instructions if executed further result in said modifying comprising:
    reducing the total inter-word length of said at least one set.

12. The article of claim 9, wherein said instructions if executed further result in said modifying comprising:
    increasing the total inter-word length of at least one set.

13. The article of claim 9, wherein said instructions if executed further result in said modifying comprising:
    reducing a total inter-word length of a first set of said sets; and
    increasing a total inter-word length of a second set of said sets.

14. The article of claim 9, said instructions if executed further result in:
    extracting said embedded data bit from said text row.

15. The article of claim 9, said instructions if executed further result in:
    extracting said embedded data bit from said text row without employing an original version of said text row.

16. An apparatus comprising:
    means for dividing inter-word spaces in a text row among a plurality of sets, said sets each having:
        at least two inter-word spaces, and
        an equal or nearly equal total inter-word length; and
    means for modifying the total inter-word length of at least one of said sets to embed a bit of data.

17. The apparatus of claim 16, and further comprising:
    means for extracting said embedded data bit from said text row.

18. The apparatus of claim 16, wherein said means for extracting comprises means for extracting said embedded data bit from said text row without employing an original version of said text row.

19. A method of extracting data hidden in a text row, the method comprising:
    determining the total inter-word length for each of two or more sets of inter-word spaces in a text row, said sets each having at least two inter-word spaces;
    comparing the total inter-word lengths of the two or more sets of inter-word spaces; and
    extracting a data value based on results of the comparing wherein the determining, comparing and extracting are performed using one or more processing devices.

20. The method of claim 19, wherein comparing comprises comparing total inter-word lengths of two sets of inter-word spaces within a text row, and wherein extracting comprises extracting a value of 1 if the comparing determines that a first one of the sets has a greater total inter-word length than a second one of the sets and extracting a 0 if the comparing determines that the second one of the sets has a greater total inter-word length than the first one of the sets.

21. An article comprising:
    a storage medium having stored thereon instructions that if executed by a computing device result in the computing device executing a method of extracting data hidden in a text row, the method comprising:
        determining the total inter-word length for each of two or more sets of inter-word spaces in a text row, said sets each having at least two inter-word spaces;
        comparing the total inter-word lengths of the two or more sets of inter-word spaces; and
        extracting a data value based on results of the comparing.

22. The article of claim 21, wherein comparing comprises comparing total inter-word lengths of two sets of inter-word spaces within a text row, and wherein extracting comprises extracting a value of 1 if the comparing determines that a first one of the sets has a greater total inter-word length than a second one of the sets and extracting a 0 if the comparing determines that the second one of the sets has a greater total inter-word length than the first one of the sets.

* * * * *